United States Patent
Pan et al.

(10) Patent No.: US 11,316,379 B2
(45) Date of Patent: Apr. 26, 2022

(54) WIRELESS CHARGING SYSTEM, WIRELESS CHARGING DEVICE AND WIRELESS POWERED DEVICE

(71) Applicant: BEIJING XIAOMI MOBILE SOFTWARE CO., LTD., Beijing (CN)

(72) Inventors: Yajun Pan, Beijing (CN); Shujun Wei, Beijing (CN); Jian Bai, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 220 days.

(21) Appl. No.: 16/698,903

(22) Filed: Nov. 27, 2019

(65) Prior Publication Data

US 2020/0336016 A1 Oct. 22, 2020

(30) Foreign Application Priority Data

Apr. 22, 2019 (CN) .......................... 201910325221.9

(51) Int. Cl.
 *H02J 50/30* (2016.01)
 *H02S 40/38* (2014.01)
 *H02J 50/80* (2016.01)
 *H02J 7/02* (2016.01)

(52) U.S. Cl.
 CPC .............. *H02J 50/30* (2016.02); *H02J 7/025* (2013.01); *H02J 50/80* (2016.02); *H02S 40/38* (2014.12)

(58) Field of Classification Search
 CPC combination set(s) only.
 See application file for complete search history.

(56) References Cited

U.S. PATENT DOCUMENTS

| | | | | |
|---|---|---|---|---|
| 11,114,886 | B2* | 9/2021 | Partovi | ................... H02J 50/40 |
| 2010/0167797 | A1* | 7/2010 | Morichi | ............ H04W 52/0296 |
| | | | | 455/572 |
| 2011/0203631 | A1* | 8/2011 | Rasco | .................... H02S 40/38 |
| | | | | 136/244 |
| 2012/0249064 | A1* | 10/2012 | Negishi | .................. H02J 50/60 |
| | | | | 320/108 |

(Continued)

FOREIGN PATENT DOCUMENTS

| | | |
|---|---|---|
| CA | 3038974 A1 | 4/2018 |
| CN | 105186617 A | 12/2015 |

(Continued)

OTHER PUBLICATIONS

Extended European Search Report issued in EP Application No. 19219211.0 dated Apr. 20, 2020, (9p).

(Continued)

*Primary Examiner* — Stacy Whitmore
(74) *Attorney, Agent, or Firm* — Arch & Lake LLP (57) ABSTRACT

A wireless charging system is provided. The wireless charging system includes: a wireless charging device and a wireless powered device. The wireless charging device includes a light emitter configured to emit infrared light. The wireless powered device includes a surface with a light receiver disposed thereon, where the light receiver is configured to receive the infrared light emitted from the light emitter. The light receiver is further configured to convert light energy of the received infrared light into electrical energy and supply the electrical energy to power the wireless powered device.

20 Claims, 6 Drawing Sheets

(56) References Cited

U.S. PATENT DOCUMENTS

| | | | | |
|---|---|---|---|---|
| 2013/0151293 A1* | 6/2013 | Karner | ................... | B60L 58/30 |
| | | | | 705/5 |
| 2015/0222138 A1* | 8/2015 | Amano | ................ | H02J 7/0044 |
| | | | | 320/108 |
| 2015/0326053 A1* | 11/2015 | Amano | .................. | H02J 50/40 |
| | | | | 320/108 |
| 2015/0380971 A1* | 12/2015 | Priev | ....................... | H02J 50/40 |
| | | | | 320/108 |
| 2016/0109852 A1* | 4/2016 | Kuwabara | ............... | H02J 7/025 |
| | | | | 368/223 |
| 2016/0218553 A1* | 7/2016 | He | ........................ | H02J 7/0036 |
| 2017/0019180 A1* | 1/2017 | Lucrecio | .............. | H04B 10/807 |
| 2017/0250561 A1* | 8/2017 | Li | .......................... | H02J 7/025 |
| 2018/0006504 A1* | 1/2018 | Lin | ........................ | H02J 7/025 |
| 2018/0375340 A1 | 12/2018 | Bell et al. | | |
| 2020/0067341 A1* | 2/2020 | Glover | ................... | H02J 7/025 |
| 2021/0135501 A1* | 5/2021 | Pan | ......................... | H02J 50/60 |
| 2021/0159716 A1* | 5/2021 | Hua | .................... | B25J 11/0085 |

FOREIGN PATENT DOCUMENTS

| | | |
|---|---|---|
| CN | 105186618 A | 12/2015 |
| CN | 105449786 A | 3/2016 |
| DE | 102016209151 | 11/2017 |
| WO | 2018008919 A1 | 1/2018 |

OTHER PUBLICATIONS

First Office Action issued in Chinese Application No. 201910325221.9 dated Jul. 5, 2021, (18p).

Office Action issued in EP Application No. 19219211.0 dated Nov. 23, 2021, (4p).

\* cited by examiner

WIRELESS CHARGING SYSTEM, WIRELESS CHARGING DEVICE AND WIRELESS POWERED DEVICE

CROSS-REFERENCE TO RELATED APPLICATION

This application claims priority to and benefits of Chinese Patent Application No. 201910325221.9, filed with the State Intellectual Property Office of P. R. China on Apr. 22, 2019, the entire contents of which are incorporated herein by reference.

TECHNICAL FIELD

The present disclosure relates to the field of wireless charging, and more particularly, to a wireless charging system, a wireless charging device and a wireless powered device.

BACKGROUND

Wireless charging technology is a technology applicable for charging various mobile terminals such as a mobile phone, a tablet, a notebook computer or the like.

A wireless charging technology in the related art includes a wireless charging device and a wireless powered device. The wireless charging device includes a charging coil, and the wireless powered device includes a powered coil and a battery.

However, during the wireless charging, since the wireless charging process is implemented through electromagnetic induction, it is necessary to keep a distance between the wireless charging device and the wireless powered device within a short range, resulting in poor flexibility of the wireless powered device during the wireless charging process.

SUMMARY

Various examples of the present disclosure provide a wireless charging system, a wireless charging device and a wireless powered device According to a first aspect of the present disclosure, a wireless charging system is provided, including: a wireless charging device, including a light emitter configured to emit infrared light; and a wireless powered device, having a surface with a light receiver disposed thereon, the light receiver being configured to receive the infrared light emitted from the light emitter, where the light receiver is further configured to convert light energy of the received infrared light into electrical energy and supply the electrical energy to power the wireless powered device.

According to a second aspect of the present disclosure, a wireless charging device is provided, including a light emitter configured to emit infrared light, where the infrared light is configured to supply power to a wireless powered device, and a light receiver configured to receive the infrared light emitted from the light emitter is disposed on a surface of the wireless powered device.

According to a third aspect of the present disclosure, a wireless powered device is provided, the wireless powered device having a surface with a light receiver disposed thereon, where the light receiver is configured to receive infrared light emitted from a light emitter of a wireless charging device, convert light energy of the received infrared light into electrical energy and supply the electrical energy to power the wireless powered.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference is made in detail to exemplary aspects, examples of which are illustrated in the accompanying drawings. The following description refers to the accompanying drawings where the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure.

The terminology used herein is for the purpose of describing particular examples only and is not intended to limit the present disclosure. As used herein, the singular forms "a," "an" and "the" are intended to include the plural forms as well, unless the context clearly indicates otherwise. It shall be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information.

The words "above," "below," "upper," "front," "rear," "top," "bottom," etc., may be used to refer to relative positions of an element under normal operation mode or installation orientation, to facilitate understanding of the relevant examples. The scope of the disclosure is not limited to the specific operation mode or installation orientation as described.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

Figure 1:
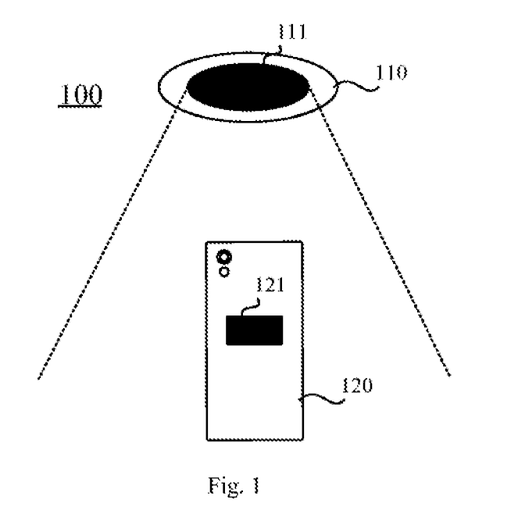
FIG. 1 is a schematic diagram of wireless charging between a wireless charging device and a wireless powered device in a wireless charging system according to an exemplary aspect of the present disclosure.

FIG. 1 is a structural block diagram of a wireless charging system 100 according to an exemplary aspect of the present disclosure. As illustrated in FIG. 1, the wireless charging system 100 includes a wireless charging device 110 and a wireless powered device 120.

The wireless charging device 110 includes a light emitter 111 configured to emit infrared light. A light receiver 121 is disposed on a surface of the wireless powered device 120. The light receiver 121 is configured to receive the infrared light emitted from the light emitter 111. The light receiver 121 is further configured to convert light energy of the received infrared light into electrical energy, and supply the electrical energy to power the wireless powered device 120, i.e., supply power for operations of the wireless powered device 120 with the electrical energy.

A position at which the light receiver 121 is disposed on the wireless powered device 120 is described below. Optionally, the wireless powered device 120 includes a front surface, a rear surface, and side surfaces.

Optionally, different cases for the wireless powered device 120 are described below.

In an example, when the wireless powered device 120 is a single-screen terminal device, the front surface of the wireless powered device 120 is a surface corresponding to a display screen in the wireless powered device 120, and the rear surface of the wireless powered device 120 is a surface corresponding to a rear housing in the wireless powered device 120.

In an example, when the wireless powered device 120 is a dual-screen terminal device, the front surface of the wireless powered device 120 is a surface corresponding to a primary display screen in the wireless powered device 120, and the rear surface is a surface corresponding to a secondary display screen in the wireless powered device 120.

In an example, when the wireless powered device 120 is a terminal device having a foldable display screen, the front surface of the wireless powered device 120 is a surface corresponding to the foldable display screen when the foldable display screen is in an unfolded state, and the rear surface of the wireless powered device 120 is a surface corresponding to the rear housing when the foldable display screen is in the unfolded state. For example, when the foldable display screen is an inward-foldable display screen, the rear housing is an outer surface in a folded state; and when the foldable display screen is an outward-foldable display screen, the rear housing is an inner surface in the folded state.

To sum up, in the wireless charging system according to the examples of the present disclosure, by providing the light emitter in the wireless charging device and providing the light receiver on the surface of the wireless powered device, the wireless powered device may receive the infrared light emitted from the light emitter of the wireless charging device through the light receiver, so as to convert the light energy of the infrared light into the electrical energy for supplying power to the wireless powered device, which eliminates the necessity for keeping a short distance between the wireless charging device and the wireless powered device and thereby avoids poor flexibility of the wireless powered device during the wireless charging process.

With the wireless charging system according to the examples of the present disclosure, in a case where the light receiver is disposed on the rear surface of the wireless powered device, when a user is using the wireless powered device, the display screen of the wireless powered device is in the user's line of sight. Accordingly, there is a high probability of the light receiver falling within the range of the infrared light emitted from the light emitter, which facilitates wireless charging of the wireless powered device while the user uses the wireless powered device.

Optionally, the position at which the light receiver 121 is disposed includes at least one of the front surface and the rear surface of the wireless powered device 120. In other words, the light receiver 121 may be disposed on the front surface of the wireless powered device 120, or on the rear surface of the wireless powered device 120, or otherwise on both the front surface and the rear surface of the wireless powered device 120.

Figure 2:
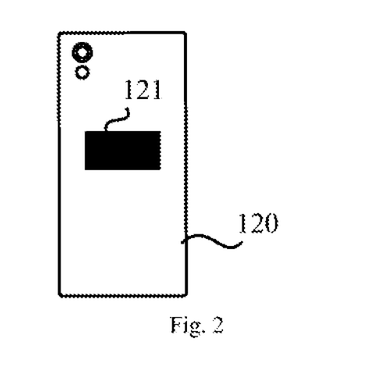
FIG. 2 is a schematic diagram of configuring a light receiver on a rear surface of a wireless powered device according to an exemplary aspect of the present disclosure.

Illustratively, an example in which the light receiver 121 is disposed on the rear surface of the wireless powered device 120 is described below. As illustrated in FIG. 2, the light receiver 121 is disposed on the rear surface of the wireless powered device 120.

Alternatively, the light receiver 121 may be disposed on a side surface of the wireless powered device 120. The side surface of the wireless powered device 120 includes at least one of a top surface, a bottom surface, a left side surface, and a right side surface of the wireless powered device 120. Alternatively or additionally, the light receiver 121 disposed on each surface may include a plurality of independent receivers, or the light receiver 121 may be a single receiver. For example, a light receiver 1 may be disposed on the top surface, a light receiver 2 may be disposed on the bottom surface, a light receiver 3 may be disposed on the left side surface, and a light receiver 4 may be disposed on the right side surface. Alternatively, the light receiver 121 may be an integrated light receiver 121 provided on these surfaces, e.g., extending from the top surface to the left side surface, and to the bottom surface and the right side surface. Alternatively, a light receiver a may be provided on the top surface and the left side surface, extending from the top surface to the left side surface, and a light receiver b may be provided on the bottom surface and the right side surface, extending from the bottom surface to the right side surface.

Figure 3:
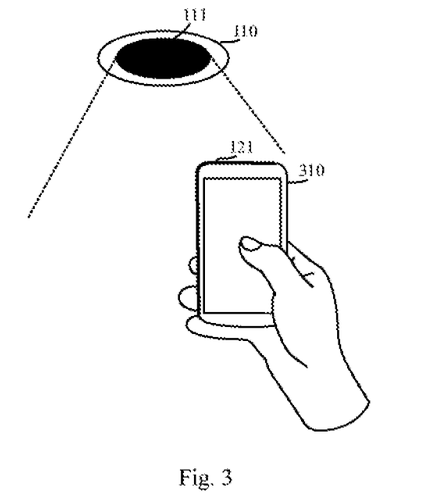
FIG. 3 is a schematic diagram of configuring a light receiver on a side surface of a wireless powered device according to an exemplary aspect of the present disclosure.

Illustratively, the arrangement of the light receiver 121 in the wireless powered device 120 is described below in combination with the usage of the terminal by the user. As illustrated in FIG. 3, an example in which the user uses the terminal 310 by holding it with the right hand is described below. When the user holds the terminal 310 with the right hand, the right side surface and the bottom surface of the terminal 310 are blocked by the right hand of the user, while the left side surface and the top surface of the terminal 310 are not blocked. Accordingly, the light receiver 121 is arranged on the left side surface and the top surface of the terminal, extending from the left side surface to the top surface as shown in FIG. 3, so that the infrared light emitted from the light emitter 111 of the wireless charging device 110 may be received by the light receiver 121 without being blocked.

Alternatively, when the wireless powered device 120 includes a foldable display screen, the foldable display screen may include a first screen area and a second screen area. The light receiver 121 may be disposed between the first screen area and the second screen area in the foldable display screen. Alternatively, the area between the first screen area and the second screen area may include a first area corresponding to the front surface and a second area corresponding to the rear surface. The light receiver 121 may be disposed in the first area, or in the second area, or otherwise in both the first area and the second area.

In an example, the light receiver 121 of the wireless powered device 120 may include a photovoltaic cell configured to convert the light energy of the received infrared light into electrical energy. The photovoltaic cell is used for directly converting solar energy into the electrical energy. The photovoltaic cell is generally a silicon solar cell using silicon as a substrate, and may be categorized into a monocrystalline-silicon solar cell, a polycrystalline-silicon solar cell, and an amorphous-silicon solar cell. Based on a principle similar to that of the solar cell, the photovoltaic cell is a cell device for converting the light energy into the electrical energy directly through photoelectric effect or photochemical effect. After converting the infrared light into direct current, the photovoltaic cell further converts the direct current into alternating current to supply power to the wireless powered device.

In an example, the wireless powered device 120 further includes a battery. After the photovoltaic cell converts the light energy into the electrical energy, the battery in the wireless powered device 120 may be charged with the electrical energy. When the infrared light is not received by the light receiver 121, the battery in the wireless powered device 120 may supply power for the operations of the wireless powered device 120.

In an example, since the propagation of the infrared light may be easily blocked by an obstacle, the light receiver 121 is configured to receive the infrared light emitted from the light emitter 111 when the light receiver 121 is disposed within an emission range of the infrared light from the light emitter 111 and there is no obstacle between the light receiver 121 and the light emitter 111.

In an example, the wireless charging device 110 may further include a charging manager or a charging management module. The charging manager may be configured with an access upper limit which indicates the maximum number of the wireless powered devices 120 to be charged wirelessly through the infrared light emitted from the light emitter 111, i.e., the maximum number of the wireless powered devices 120 that can be charged wirelessly at the same time. The charging manager may also be configured to control the number of the wireless powered devices 120 that are being charged wirelessly through the infrared light by using the access upper limit. The charging manager may be an application specific integrated circuit, or it may include programmable logic arrays or microcontrollers appropriately programmed or other hardware devices. For example, the charging manager may include one or more circuit with or without stored code or instructions that can be executed by one or more processors.

In an example, when the wireless powered device 120 is charged with the infrared light emitted from the light emitter 111 of the wireless charging device 110, the wireless charging device 110 may receive an access feedback sent from the wireless powered device 120 and count (i.e., perform counting) according to the access feedback. When the counted number reaches the access upper limit, a next wireless powered device 120 that sends the access feedback to the wireless charging device 110 receives an access rejection notification from the wireless charging device 110. Then, the wireless powered device 120 stops receiving the infrared light according to the access rejection notification so as to stop the wireless charging.

In an example, the wireless charging device 110 includes a first communication device, and the wireless powered device 120 includes a second communication device. The wireless charging device 110 receives the access feedback sent from the wireless powered device 120 through the first communication device, and sends the access feedback to the charging manager. The charging manager counts according to the access feedback received. When the counted number reaches the access upper limit, and when a next target wireless powered device 120 sends the access feedback to the wireless charging device 110, the wireless charging device 110 sends an access rejection notification to the target wireless powered device 120 through the first communication device. Then, the target wireless powered device 120 stops receiving the infrared light according to the access rejection notification.

In an example, the light receiver 121 is configured with a corresponding automatic light blocking plate, which may be in a state corresponding to any one of a light blocking state and a light transmitting state. When the automatic light blocking plate corresponds to the light blocking state, the automatic light blocking plate blocks between the light receiver 121 and the light emitter 111, i.e., blocks the light receiver 121 from the infrared light emitted from the light emitter 111. When the automatic light blocking plate corresponds to the light transmitting state, a position or a state of the automatic light blocking plate may be adjusted to disable the blocking between the light receiver 121 and the light emitter 111. The target wireless powered device 120 may adjust the state of the automatic light blocking plate according to the access rejection notification, e.g., place the automatic light blocking plate between the light receiver 121 and the light emitter 111 for blocking, so as to prevent the light receiver 121 from receiving the infrared light emitted from the light emitter 111.

Figure 4:
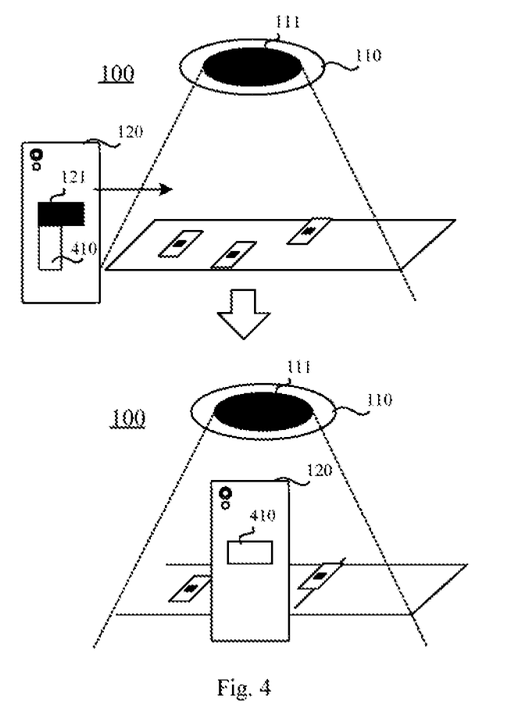
FIG. 4 is a schematic diagram of controlling a number of wireless powered devices charged wirelessly according to an access upper limit according to an exemplary aspect of the present disclosure.

For example, as illustrated in FIG. 4, the light receiver 121 is disposed on the rear surface of the wireless powered device 120. The wireless charging device 110 includes the light emitter 111. The range of the infrared light emitted from the light emitter 111 covers three light receivers that are currently receiving the infrared light. The access upper limit set in the charging manager of the wireless charging device 110 is 3. Consequently, as the wireless powered device 120 enters the range of the infrared light emitted from the light emitter 111, the wireless charging device 110 sends an access rejection notification to the wireless powered device 120. The wireless powered device 120 adjusts the state of the automatic light blocking plate 410 according to the access rejection notification, and places the automatic light blocking plate 410 above the light receiver 121 for blocking, thereby preventing the light receiver 121 from receiving the infrared light emitted from the light emitter 111.

Figure 5:
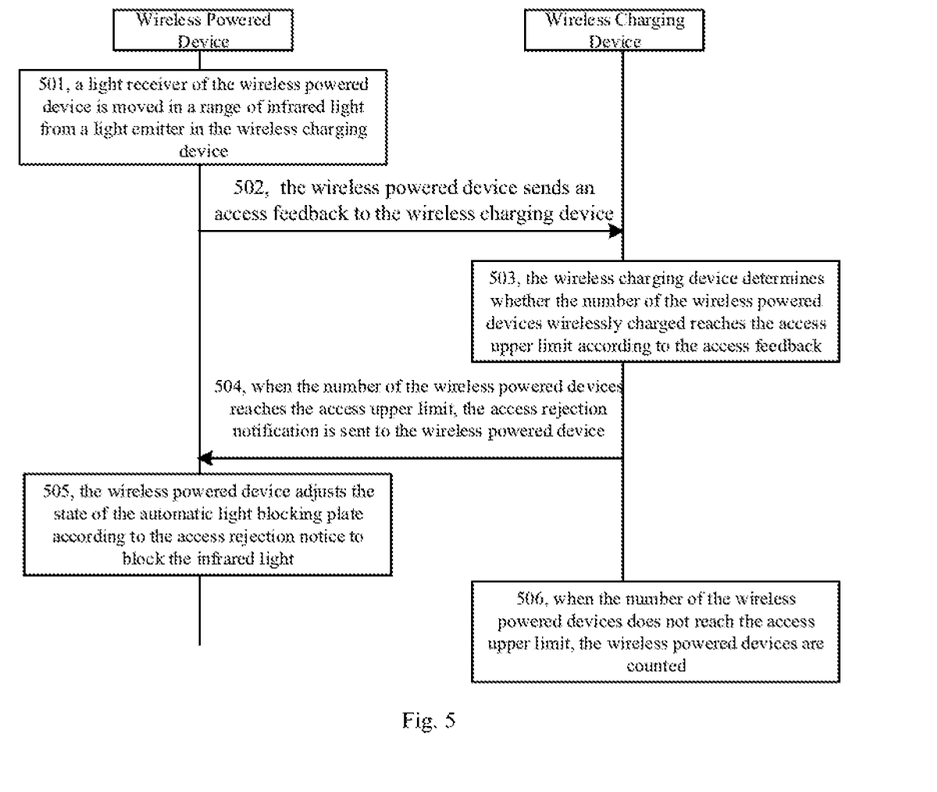
FIG. 5 is a flow chart of a method for limiting a number of wireless powered devices being charged wirelessly according to an exemplary aspect of the present disclosure.

Illustratively, FIG. 5 is a flow chart of a method for limiting a number of wireless powered devices being charged wirelessly according to an exemplary aspect of the present disclosure. The method is described below by taking a case in which the method is applied to the wireless charging system shown in FIG. 1 as an example. As illustrated in FIG. 5, the method includes the following steps.

In step 501, a light receiver in the wireless powered device is moved into a range of infrared light emitted from a light emitter in the wireless charging device.

In an example, the light receiver in the wireless powered device is moved into the range of the infrared light from the light emitter, and there is no obstacle between the light receiver and the light emitter.

In an example, the light receiver being in the range of the infrared light from the light emitter means that the infrared light emitted from the light emitter may reach all or part of the light receiver.

In step 502, the wireless powered device sends an access feedback to the wireless charging device.

In an example, the wireless powered device sends the access feedback to a first communication device in the wireless charging device through a second communication device in the wireless powered device.

In an example, the first communication device and the second communication device communicate with each other in an ultra-wideband carrier-free communication mode.

In step 503, the wireless charging device determines whether the number of the wireless powered devices being charged wirelessly reaches an access upper limit according to the access feedback.

In an example, the wireless charging device includes a charging manager. The charging manager is configured with the access upper limit. The access upper limit is configured to control the number of the wireless powered devices accessing the wireless charging device, i.e., being charged wirelessly by the wireless charging device.

In step 504, when the number of the wireless powered devices reaches the access upper limit, an access rejection notification is sent to the wireless powered device.

In an example, when the number of the wireless powered devices reaches the access upper limit, since the power of the infrared light emitted from the light emitter is fixed, the power received by each wireless powered device becomes too low as the number of the wireless powered devices increases, resulting in a low charging efficiency.

In step 505, the wireless powered device adjusts the state of the automatic light blocking plate according to the access rejection notice to block the infrared light.

In step 506, when the number of the wireless powered devices does not reach the access upper limit, the wireless powered devices being charged wirelessly by the wireless charging device are counted, i.e., the number of the wireless powered device is counted.

In an example, when the number of the wireless powered devices does not reach the upper access limit, the number of the wireless powered devices currently accessing the wireless charging device is counted.

In an example, the wireless charging device 110 includes the charging manager and the first communication device. The charging manager is configured with an access key. The wireless powered device 120 further includes a second communication device, and is configured to send a charging key to the first communication device through the second communication device. The charging manager is configured to control wireless charging of the wireless powered device 120 according to a matching between the charging key received by the first communication device and the access key.

In an example, when the charging key sent from the wireless powered device 120 matches the access key, the wireless powered device 120 is enabled to be charged wirelessly through the infrared light emitted from the light emitter 111. However, when the charging key sent from the wireless powered device 120 does not match the access key, the wireless charging device 110 sends the access rejection notification to the second communication device in the wireless powered device 120 through the first communication device. Then, the wireless powered device 120 stops receiving the infrared light according to the access rejection notification.

In an example, the light receiver 121 is configured with a corresponding automatic light blocking plate, which may be in a state corresponding to any one of a light blocking state and a light transmitting state. When the automatic light blocking plate corresponds to the light blocking state, the automatic light blocking plate blocks the infrared light between the light receiver 121 and the light emitter 111. When the automatic light blocking plate corresponds to the light transmitting state, a position or a state of the automatic light blocking plate may be adjusted to disable the blocking between the light receiver 121 and the light emitter 111. The target wireless powered device 120 may adjust the state of the automatic light blocking plate according to the access rejection notification, for example, place the automatic light blocking plate between the light receiver 121 and the light emitter 111 for blocking, so as to prevent the light receiver 121 from receiving the infrared light emitted from the light emitter 111.

Figure 6:
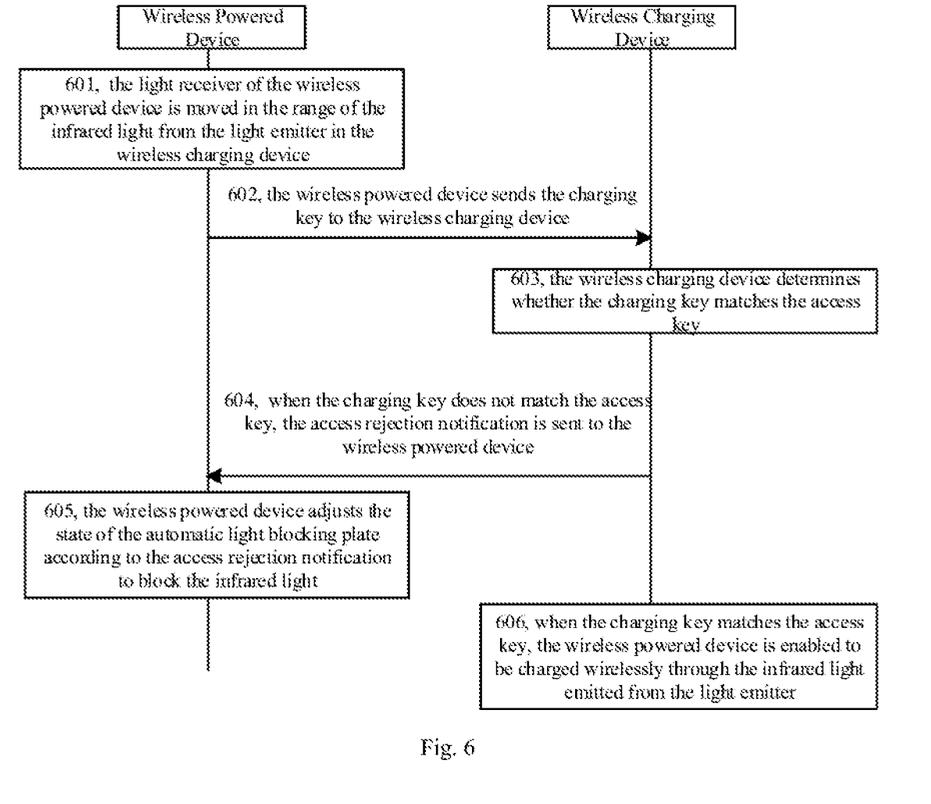
FIG. 6 is a flow chart of an access control method of a wireless powered device according to an exemplary aspect of the present disclosure.

Illustratively, FIG. 6 is a flow chart of an access control method of a wireless powered device according to an exemplary aspect of the present disclosure. The method is described below by taking a case in which the method is applied to the wireless charging system shown in FIG. 1 as an example. As illustrated in FIG. 6, the method includes the following steps.

In step 601, a light receiver in the wireless powered device is moved into the range of the infrared light emitted from the light emitter in the wireless charging device.

In an example, the light receiver in the wireless powered device is moved into the range of the infrared light from the light emitter, and there is no obstacle between the light receiver and the light emitter.

In an example, the light receiver being in the range of the infrared light from the light emitter means that the infrared light emitted from the light emitter may reach all or part of the light receiver.

In step 602, the wireless powered device sends a charging key to the wireless charging device.

In an example, the wireless powered device sends the charging key to the first communication device of the wireless charging device through the second communication device of the wireless powered device.

In an example, the first communication device and the second communication device communicate with each other in an ultra-wideband carrier-free communication mode.

In an example, after the light receiver in the wireless powered device is moved in the range of the infrared light from the light emitter, a key input interface is displayed on the wireless powered device. Then, after the user inputs the charging key in the key input interface, the charging key is sent to the wireless charging device.

In step 603, the wireless charging device determines whether the charging key matches the access key.

In an example, the wireless charging device includes a charging manager. The charging manager is configured with the access key. The access key is configured to manage the wireless powered devices being charged wirelessly by the wireless charging device.

In step 604, when the charging key does not match the access key, an access rejection notification is sent to the wireless powered device.

When the charging key does not match the access key, the wireless powered device does not have a permission to access the wireless charging device for wireless charging. Consequently, an access rejection notification is sent to the wireless powered device.

In step 605, the wireless powered device adjusts the state of the automatic light blocking plate according to the access rejection notification to block the infrared light.

In step 606, when the charging key matches the access key, the wireless powered device is enabled to be charged wirelessly through the infrared light emitted from the light emitter.

In an example, the wireless charging device 110 may be a lamp and/or a home appliance. When the wireless charging device 110 is implemented as the lamp, the lamp includes at least one of a desk lamp, a ceiling light, a floor light and a wall lamp.

When the wireless charging device is implemented as the home appliance, the home appliance includes at least one of a television, an air conditioner, a monitoring camera and an air cleaner.

In an example, when the wireless charging device 110 is the lamp and/or the home appliance, the wireless charging device 110 includes a switch. When the switch is turned on, the wireless charging device 110 performs functions of the lamp and/or the home appliance and emits the infrared light through the light emitter. Alternatively, the wireless charging device 110 includes a first switch and a second switch. When the first switch is turned on, the wireless charging device 110 performs the functions of the lamp and/or the home appliance, and when the second switch is turned on, the wireless charging device emits the infrared light through the light emitter.

In an example, the wireless powered device 120 is a wearable mobile terminal, such as a smart watch and smart glasses, and/or a handheld mobile terminal. Alternatively, the wireless powered device 120 may be an intelligent vehicle, an audio playing device, a home appliance, or the like.

Figure 7:
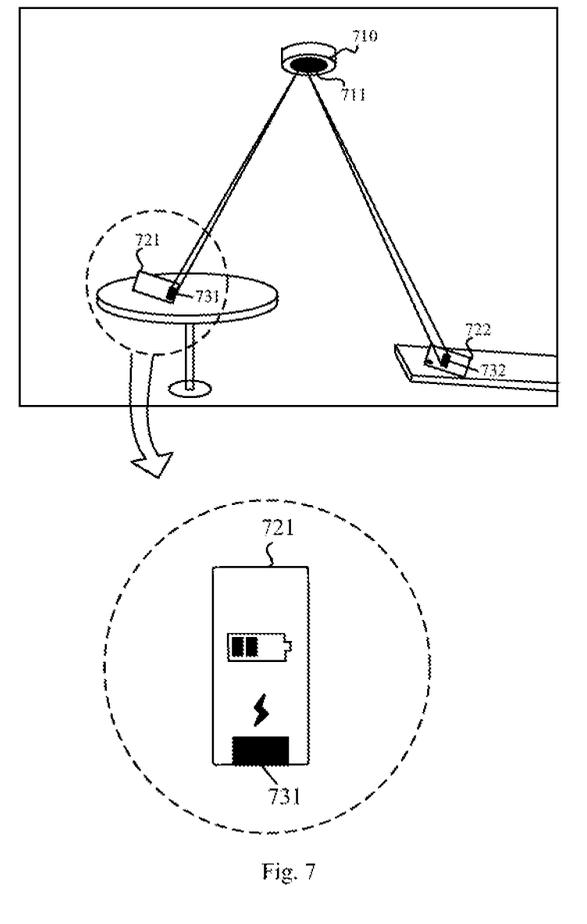
FIG. 7 is a schematic diagram of wireless charging when a wireless charging device is a ceiling light according to an exemplary aspect of the present disclosure.

Illustratively, an example is described below, in which the wireless charging device is the lamp, or particularly, a ceiling light. As illustrated in FIG. 7, a ceiling light 710 is arranged on the ceiling of a room. The ceiling light 710 includes a light emitter 711 which is emitting infrared light. A wireless powered device 721 and a wireless powered device 722 are placed on a top surface of a table in the room. A light receiver 731 is disposed on a surface of the wireless powered device 721. A light receiver 732 is disposed on a surface of the wireless powered device 722. There is no obstacle between the light receivers 731, 732 and the light emitter 711. Consequently, the wireless powered devices 721, 722 may receive the infrared light emitted from the light emitter 711 through the light receivers 731, 732, and convert the light energy of the infrared light into the electrical energy, so as to supply power to the wireless powered device 721 and the wireless powered device 722.

Figure 8:
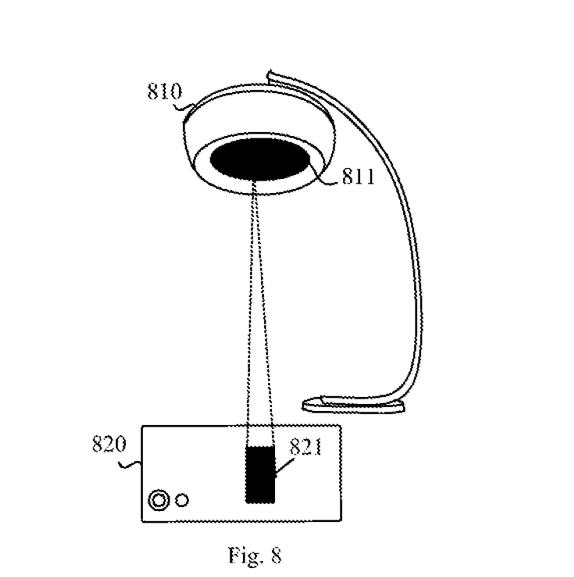
FIG. 8 is a schematic diagram of wireless charging when a wireless charging device is a desk lamp according to an exemplary aspect of the present disclosure.

Illustratively, another example is described below, in which the lamp is a desk lamp. As illustrated in FIG. 8, a desk lamp 810 is placed on a top surface of a table. The desk lamp 810 includes a light emitter 811 which is emitting infrared light. A wireless powered device 820 is placed below the desk lamp. A light receiver 821 is disposed on a rear surface of the wireless powered device 820. There is no obstacle between the light receiver 821 and the light emitter 811. Consequently, the wireless powered device 820 may receive the infrared light emitted from the light emitter 811 through the light receiver 821, and convert the light energy of the infrared light into the electrical energy, so as to supply power to the wireless powered device 820.

Figure 9:
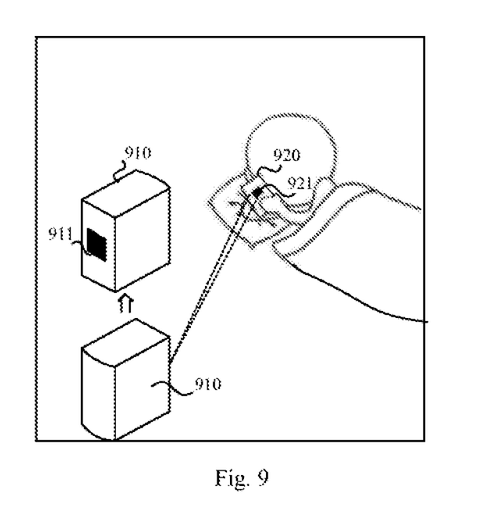
FIG. 9 is a schematic diagram of wireless charging when a wireless charging device is a home appliance according to an exemplary aspect of the present disclosure.

Illustratively, still another example is described below, in which the wireless charging device is a home appliance, e.g., an air cleaner. As illustrated in FIG. 9, an air cleaner 910 includes a light emitter 911 which is emitting infrared light. A user is using a wireless powered device 920. A light receiver 921 is disposed on a rear surface of the wireless powered device 920. There is no obstacle between the light receiver 921 and the light emitter 911. Consequently, the wireless powered device 920 may receive the infrared light emitted from the light emitter 911 through the light receiver 921, and convert the light energy of the infrared light into the electrical energy, so as to supply power to the wireless powered device 920.

Although in the above examples, the wireless charging device 110 and the wireless powered device 120 being implemented as a wireless charging system are illustrated, it should be noted that the wireless charging device 110 and the wireless powered device 120 in the wireless charging system may be implemented as two discrete mobile terminals.

According to examples of the present disclosure, a wireless charging system includes a wireless charging device, including a light emitter configured to emit infrared light; and a wireless powered device, having a surface with a light receiver disposed thereon, the light receiver being configured to receive the infrared light emitted from the light emitter, where the light receiver is further configured to convert light energy of the received infrared light into electrical energy and supply the electrical energy to power the wireless powered device.

In an example, the light receiver is disposed at a position on at least one of a front surface and a rear surface of the wireless powered device. The front surface is a surface corresponding to a display screen in the wireless powered device, and the rear surface is a surface corresponding to a rear housing in the wireless powered device. Alternatively, the front surface is a surface corresponding to a primary display screen, and the rear surface is a surface corresponding to a secondary display screen.

In an example, the light receiver is disposed at a position on a side surface of the wireless powered device; and the side surface of the wireless powered device includes at least one of a top surface, a bottom surface, a left side surface and a right side surface of the wireless powered device.

In an example, the wireless powered device includes a foldable display screen including a first screen area and a second screen area; and the light receiver is disposed between the first screen area and the second screen area in the foldable display screen.

In an example, the light receiver includes a photovoltaic cell configured to convert the light energy of the received infrared light into the electrical energy.

In an example, when the light receiver is disposed within an emission range of the infrared light from the light emitter, and there is no obstacle between the light receiver and the light emitter, the light receiver is configured to receive the infrared light emitted from the light emitter.

In an example, the wireless charging device further includes a charging manager, the charging manager being configured with an access upper limit which indicates a maximum number of wireless powered devices to be charged wirelessly through the infrared light emitted from the light emitter, and being configured to control a number of the wireless powered devices being charged wirelessly through the infrared light by using the access upper limit.

In an example, the wireless charging device further includes: a charging manager configured with an access key and a first communication device; and the wireless powered device further includes a second communication device. The wireless powered device is configured to send a charging key to the first communication device through the second communication device, and the charging manager is configured to control wireless charging of the wireless powered device according to a matching between the charging key received by the first communication device and the access key.

In an example, the wireless charging device is a lamp and/or a home appliance. When the wireless charging device is implemented as the lamp, the lamp includes at least one of a desk lamp, a ceiling light, a floor light and a wall lamp. When the wireless charging device is implemented as the home appliance, the home appliance includes at least one of a television, an air conditioner, a monitoring camera and an air cleaner.

In an example, the wireless powered device is a wearable mobile terminal and/or a handheld mobile terminal.

According to examples of the present disclosure, a wireless charging device is provided. The wireless charging device includes a light emitter configured to emit infrared light. The infrared light is configured to supply power to a wireless powered device. A light receiver configured to receive the infrared light emitted from the light emitter is disposed on a surface of the wireless powered device.

In an example, the wireless charging device further includes a charging manager, the charging manager being configured with an access upper limit which indicates a maximum number of wireless powered devices to be charged wirelessly through the infrared light emitted from the light emitter, and being configured to control a number of the wireless powered devices being charged wirelessly through the infrared light by using the access upper limit.

In an example, the wireless charging device further includes a charging manager configured with an access key, and a first communication device. The wireless charging device is configured to receive a charging key sent from the wireless powered device through the first communication device, and the charging manager is configured to control wireless charging of the wireless powered device according to a matching between the charging key received by the first communication device and the access key.

In an example, the wireless charging device is a lamp and/or a home appliance. When the wireless charging device is implemented as the lamp, the lamp includes at least one of a desk lamp, a ceiling light, a floor light and a wall lamp. When the wireless charging device is implemented as the home appliance, the home appliance includes at least one of a television, an air conditioner, a monitoring camera and an air cleaner.

According to examples of the present disclosure, a wireless powered device is provided. A light receiver is disposed on a surface of the wireless powered device. The light receiver is configured to receive infrared light emitted from a light emitter of a wireless charging device, and is further configured to convert light energy of the received infrared light into electrical energy and supply the electrical energy to power the wireless powered device.

In an example, the light receiver is disposed at a position on at least one of a front surface and a rear surface of the wireless powered device. The front surface is a surface corresponding to a display screen in the wireless powered device, and the rear surface is a surface corresponding to a rear housing of the wireless powered device. Alternatively, the front surface is a surface corresponding to a primary display screen, and the rear surface is a surface corresponding to a secondary display screen.

In an example, the light receiver is disposed at a position on a side surface of the wireless powered device. The side surface of the wireless powered device includes at least one of a top surface, a bottom surface, a left side surface and a right side surface of the wireless powered device In an example, the wireless powered device includes a foldable display screen including a first screen area and a second screen area. The light receiver is disposed between the first screen area and the second screen area of the foldable display screen.

In an example, the light receiver includes a photovoltaic cell configured to convert the light energy of the received infrared light into the electrical energy.

In an example, when the light receiver is disposed within an emission range of the infrared light from the light emitter, and there is no obstacle between the light receiver and the light emitter, the light receiver is configured to receive the infrared light emitted from the light emitter.

By providing the light emitter in the wireless charging device and providing the light receiver on the surface of the wireless powered device, the wireless powered device may receive the infrared light emitted from the light emitter of the wireless charging device through the light receiver, so as to convert the light energy of the infrared light into the electrical energy for supplying power to the wireless powered device, which eliminates the necessity for keeping a short distance between the wireless charging device and the wireless powered device and thereby avoids poor flexibility of the wireless powered device during the wireless charging process.

It should be understood that "a plurality of" herein means two or more, and "and/or," describing an association of associated objects, means that there may be three relationships. For example, A and/or B may mean that: A exists independently, A and B exist simultaneously, and B exists independently. The character "/" generally indicates that the associated objects are in an "or" relationship.

The above-mentioned serial numbers of the examples of the present disclosure are merely for description and do not represent advantages or disadvantages of the examples.

It would be understood by those skilled in the art that all or a part of the steps carried by the method in the above-described examples may be completed by hardware, or by relevant hardware instructed by a program. The program may be stored in a computer readable storage medium. The above-mentioned storage medium may be a read-only memory, a magnetic disk, an optical disk or the like.

The above descriptions are merely some examples of the present disclosure, and are not intended to limit the present disclosure. Any modification, equivalent substitution, improvement, etc. that is within the spirit and principle of the present disclosure is intended to be included within the scope of the present disclosure.

What is claimed is:

1. A wireless charging system, comprising:
a wireless charging device, comprising a light emitter configured to emit infrared light; and
a wireless powered device, having a surface with a light receiver disposed thereon, the light receiver being configured to receive the infrared light emitted from the light emitter,
wherein the light receiver is further configured to convert light energy of the received infrared light into electrical energy and supply the electrical energy to power the wireless powered device,
wherein the light receiver is configured with an automatic light blocking plate, and the automatic light blocking plate is adjustable to be in one of a light blocking state or a light transmitting state,
in response to the automatic light blocking plate being adjusted to be in the light blocking state, the automatic light blocking plate blocks between the light receiver and the light emitter to prevent the light receiver from receiving the infrared light emitted from the light emitter; and
in response to the automatic light blocking plate being adjusted to be in the light transmitting state, the automatic light blocking plate disables the blocking between the light receiver and the light emitter to enable the light receiver to receive the infrared light emitted from the light emitter.

2. The wireless charging system according to claim 1, wherein
the light receiver is disposed at a position on at least one of a front surface and a rear surface of the wireless powered device,
wherein the front surface is a surface corresponding to a display screen in the wireless powered device, and the rear surface is a surface corresponding to a rear housing in the wireless powered device; or
the front surface is a surface corresponding to a primary display screen in the wireless powered device, and the rear surface is a surface corresponding to a secondary display screen in the wireless powered device.

3. The wireless charging system according to claim 1, wherein
the light receiver is disposed at a position on a side surface of the wireless powered device; and
the side surface of the wireless powered device comprises at least one of a top surface, a bottom surface, a left side surface and a right side surface of the wireless powered device.

4. The wireless charging system according to claim 1, wherein the wireless powered device comprises a foldable display screen comprising a first screen area and a second screen area; and
the light receiver is disposed between the first screen area and the second screen area in the foldable display screen.

5. The wireless charging system according to claim 1, wherein the light receiver comprises a photovoltaic cell configured to convert the light energy of the received infrared light into the electrical energy.

6. The wireless charging system according to claim 1, wherein
when the light receiver is disposed within an emission range of the infrared light from the light emitter and there is no obstacle between the light receiver and the light emitter, the light receiver is configured to receive the infrared light emitted from the light emitter.

7. The wireless charging system according to claim 6, wherein
the wireless charging device further comprises a charging manager, the charging manager being configured with an access upper limit which indicates a maximum number of wireless powered devices to be charged wirelessly through the infrared light emitted from the light emitter, and being configured to control a number of the wireless powered devices being charged wirelessly through the infrared light by using the access upper limit,
wherein in response to the number of the wireless powered devices reaching the access upper limit, an access rejection notification is sent to the wireless powered device, and
the wireless powered device adjusts the automatic light blocking plate to be in the light blocking state according to the access rejection notice to block the infrared light.

8. The wireless charging system according to claim 6, wherein
the wireless charging device further comprises a charging manager and a first communication device, the charging manager being configured with an access key; and
the wireless powered device further comprises a second communication device,
wherein the wireless powered device is configured to send a charging key to the first communication device through the second communication device; and
the charging manager is configured to control wireless charging of the wireless powered device according to a matching between the charging key received by the first communication device and the access key,
wherein in response to the charging key not matching the access key, an access rejection notification is sent to the wireless powered device, and
the wireless powered device adjusts the automatic light blocking plate to be in the light blocking state according to the access rejection notice to block the infrared light.

9. The wireless charging system according to claim 1, wherein the wireless charging device is a lamp and/or a home appliance;
wherein when the wireless charging device is the lamp, the lamp comprises at least one of a desk lamp, a ceiling light, a floor light and a wall lamp; and
when the wireless charging device is the home appliance, the home appliance comprises at least one of a television, an air conditioner, a monitoring camera and an air cleaner.

10. The wireless charging system according to claim 1, wherein the wireless powered device is a wearable mobile terminal and/or a handheld mobile terminal.

11. A wireless charging device, comprising a light emitter configured to emit infrared light,
wherein the infrared light is configured to supply power to a wireless powered device, and
a light receiver configured to receive the infrared light emitted from the light emitter is disposed on a surface of the wireless powered device,
wherein the light receiver is configured with an automatic light blocking plate, and the automatic light blocking plate is adjustable to be in one of a light blocking state or a light transmitting state,
in response to the automatic light blocking plate being adjusted to be in the light blocking state, the automatic light blocking plate blocks between the light receiver and the light emitter to prevent the light receiver from receiving the infrared light emitted from the light emitter; and in response to the automatic light blocking plate being adjusted to be in the light transmitting state, the automatic light blocking plate disables the blocking between the light receiver and the light emitter to enable the light receiver to receive the infrared light emitted from the light emitter.

12. The wireless charging device according to claim 11, wherein the wireless charging device further comprises a charging manager, the charging manager being configured with an access upper limit which indicates a maximum number of wireless powered devices to be charged wirelessly through the infrared light emitted from the light emitter, and being configured to control a number of the wireless powered devices being charged wirelessly through the infrared light by using the access upper limit, wherein in response to the number of the wireless powered devices reaching the access upper limit, an access rejection notification is sent to the wireless powered device, and the wireless powered device adjusts the automatic light blocking plate to be in the light blocking state according to the access rejection notice to block the infrared light.

13. The wireless charging device according to claim 11, wherein the wireless charging device further comprises a charging manager and a first communication device, the charging manager being configured with an access key, wherein the wireless charging device is configured to receive a charging key sent from the wireless powered device through the first communication device, and the charging manager is configured to control wireless charging of the wireless powered device according to a matching between the charging key received by the first communication device and the access key, wherein in response to the charging key not matching the access key, an access rejection notification is sent to the wireless powered device, and the wireless powered device adjusts the automatic light blocking plate to be in the light blocking state according to the access rejection notice to block the infrared light.

14. The wireless charging device according to claim 11, wherein the wireless charging device is a lamp and/or a home appliance, wherein when the wireless charging device is the lamp, the lamp comprises at least one of a desk lamp, a ceiling light, a floor light and a wall lamp; and when the wireless charging device is the home appliance, the home appliance comprises at least one of a television, an air conditioner, a monitoring camera and an air cleaner.

15. A wireless powered device, having a surface with a light receiver disposed thereon, wherein the light receiver is configured to receive infrared light emitted from a light emitter of a wireless charging device, convert light energy of the received infrared light into electrical energy, and supply the electrical energy to power the wireless powered device, wherein the light receiver is configured with an automatic light blocking plate, and the automatic light blocking plate is adjustable to be in one of a light blocking state or a light transmitting state, in response to the automatic light blocking plate being adjusted to be in the light blocking state, the automatic light blocking plate blocks between the light receiver and the light emitter to prevent the light receiver from receiving the infrared light emitted from the light emitter; and in response to the automatic light blocking plate being adjusted to be in the light transmitting state, the automatic light blocking plate disables the blocking between the light receiver and the light emitter to enable the light receiver to receive the infrared light emitted from the light emitter.

16. The wireless powered device according to claim 15, wherein the light receiver is disposed at a position on at least one of a front surface and a rear surface of the wireless powered device;

wherein the front surface is a surface corresponding to a display screen in the wireless powered device, and the rear surface is a surface corresponding to a rear housing of the wireless powered device; or the front surface is a surface corresponding to a primary display screen in the wireless powered device, and the rear surface is a surface corresponding to a secondary display screen in the wireless powered device.

17. The wireless powered device according to claim 15, wherein the light receiver is disposed at a position on a side surface of the wireless powered device; and the side surface of the wireless powered device comprises at least one of a top surface, a bottom surface, a left side surface and a right side surface of the wireless powered device.

18. The wireless powered device according to claim 15, wherein the wireless powered device comprises a foldable display screen comprising a first screen area and a second screen area; and the light receiver is disposed between the first screen area and the second screen area of the foldable display screen.

19. The wireless powered device according to claim 15, wherein the light receiver comprises a photovoltaic cell configured to convert the light energy of the received infrared light into the electrical energy.

20. The wireless powered device according to claim 15, wherein when the light receiver is disposed within an emission range of the infrared light from the light emitter, and there is no obstacle between the light receiver and the light emitter, the light receiver is configured to receive the infrared light emitted from the light emitter.

\* \* \* \* \*